(12) United States Patent
Collins et al.

(10) Patent No.: US 11,464,248 B2
(45) Date of Patent: Oct. 11, 2022

(54) CO-FERMENTED FOOD PRODUCT FROM DAIRY AND GRAIN

(71) Applicant: The Quaker Oats Company, Chicago, IL (US)

(72) Inventors: Yvonne Collins, Cork (IE); Margaret Dohnalek, Purchase, NY (US); Heidi Kleinbach-Sauter, Plano, TX (US); Michael David McDonagh, Cork (IE); Maksim N. Omarov, Moscow (RU)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 16/760,986

(22) PCT Filed: Nov. 2, 2018

(86) PCT No.: PCT/US2018/059014
§ 371 (c)(1),
(2) Date: May 1, 2020

(87) PCT Pub. No.: WO2019/090119
PCT Pub. Date: May 9, 2019

(65) Prior Publication Data
US 2020/0305474 A1 Oct. 1, 2020

Related U.S. Application Data

(60) Provisional application No. 62/581,147, filed on Nov. 3, 2017.

(51) Int. Cl.
*A23L 7/104* (2016.01)
*A23C 9/123* (2006.01)
*A23C 9/13* (2006.01)
*A23C 9/133* (2006.01)

(52) U.S. Cl.
CPC ............. *A23L 7/104* (2016.08); *A23C 9/1234* (2013.01); *A23C 9/133* (2013.01); *A23C 9/1315* (2013.01);
(Continued)

(58) Field of Classification Search
CPC ...... A23L 7/104; A23C 9/1234; A23C 9/1315; A23C 9/133; A23Y 2220/03;
(Continued)

(56) References Cited

U.S. PATENT DOCUMENTS

| 5,486,367 A | 1/1996 | Fung |
| 2003/0235559 A1 | 12/2003 | Sobol et al. |
| 2006/0141097 A1* | 6/2006 | Guo .......................... A23L 2/66 426/61 |

FOREIGN PATENT DOCUMENTS

| CN | 101455236 | 6/2009 |
| CN | 107136399 | 9/2017 |

(Continued)

OTHER PUBLICATIONS

Kaiyue, D. et al. Fermentation Technology of Oat Yogurt. (Year: 2010).*

(Continued)

*Primary Examiner* — Hamid R Badr
(74) *Attorney, Agent, or Firm* — Barnes & Thornburg LLP; Jessamine G. Pilcher

(57) ABSTRACT

A novel co-fermented food product formed from oats and dairy is described herein. The co-fermented food product includes a grain ingredient, a dairy ingredient, and a bacterial culture. The novel co-fermented food product includes a set of metabolites derived from the co-fermentation of the oat ingredient and the dairy ingredient by the bacterial culture.

8 Claims, 2 Drawing Sheets

(52) U.S. Cl.
CPC ....... *A23V 2300/24* (2013.01); *A23Y 2220/03* (2013.01); *A23Y 2220/15* (2013.01); *A23Y 2220/29* (2013.01); *A23Y 2220/35* (2013.01); *A23Y 2220/63* (2013.01); *A23Y 2220/73* (2013.01); *A23Y 2240/75* (2013.01); *A23Y 2260/35* (2013.01); *A23Y 2260/45* (2013.01); *A23Y 2300/49* (2013.01)

(58) Field of Classification Search
CPC ............ A23Y 2220/15; A23Y 2220/29; A23Y 2220/35; A23Y 2220/63; A23Y 2220/73; A23Y 2240/75; A23Y 2260/35; A23Y 2260/45; A23Y 2300/49
USPC .................................................. 426/7; 427/7
See application file for complete search history.

(56) References Cited

FOREIGN PATENT DOCUMENTS

| | | |
|---|---|---|
| CN | 107259572 | 10/2017 |
| RU | 2453133 | 6/2012 |
| RU | 2473226 | 1/2013 |

OTHER PUBLICATIONS

McBean, R. D. Packaging and Shelf Life of Yogurt. pp. 143-156 (Year: 2010).*

International Search Report and Written Opinion of PCT/US18/59014 dated Feb. 25, 2019.

Deng, "Fermentation Technology of Oat Yogurt," College of Light Industry and Food Technology, Zhongkai University of Agricultural Engineering, Guangzhou, May 30, 2009 (with English language Abstract).

Extended Search Report dated Jun. 24, 2021 in European Application No. 18874694.5.

Skiba et al., Fundamentals of Industrial Microbiology, Textbook, Biysk, Publishing House of the Altai State Technical University, 2013, pp. 50-78.

Stoyanova, et al., Antimicrobial Metabolites of Lactic-Acid Bacteria: Diversity and Properties (Overview), Applied Biochemistry and Microbiology, 2012, vol. 48, No. 3, pp. 259-275.

* cited by examiner

CO-FERMENTED FOOD PRODUCT FROM DAIRY AND GRAIN

BACKGROUND

Technical Field

Novel aspects of the present disclosure relate to a food product. More particularly, the present disclosure is directed to a food product with desirable organoleptic properties and also unique metabolites formed from the co-fermentation of a grain ingredient and a dairy ingredient.

Background

Consumers have increasingly demonstrated a preference for buying food products that can be correlated with improved health effects. As an example, recent trends show a desire to purchase and consume fermented food products. Fermentation is a process that uses bacteria to break down carbohydrates of food into simpler metabolites, which is believed to increase the digestibility and absorption of vitamins, minerals and other nutrients. The resultant metabolites produced depend upon a variety of factors including: the food ingredient undergoing fermentation, the bacterial culture used to ferment the food ingredient, and the fermentation conditions.

Regardless of any claimed health benefits, consumers will avoid purchasing food products that lack an appropriate organoleptic properties, such as taste and texture. Added texture-enhancing ingredients can have a negative effect on the taste of the final food product, and common flavorants used to modify the taste profile can reduce the perceived healthiness of the food product. Accordingly, careful ingredient selection and processing conditions should be exploited to provide the desirable attributes of the food product.

SUMMARY OF THE INVENTION

Novel aspects of the present invention are directed to a co-fermented food product formed from grains and dairy. The co-fermented food product includes a grain ingredient, a dairy ingredient, and a set of metabolites derived from the co-fermentation of the grain ingredient and the dairy ingredient.

In another embodiment, novel aspects of the present invention are directed to a method for forming a co-fermented food product from grains and dairy. The method includes the steps of combining an unfermented grain ingredient with an unfermented dairy ingredient to form an unfermented mixture; heating the unfermented mixture to a pre-heating temperature to form a pre-heated mixture; inoculating the pre-heated mixture with a bacterial culture to form an inoculated mixture; resting the inoculated mixture to form a co-fermented mixture; and blending the co-fermented mixture to form the co-fermented food product. If the co-fermented food product will be offered as a shelf-stable product or a fresh, chilled product then subsequent processing steps are applied as described in more detail herein.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Figure 1:
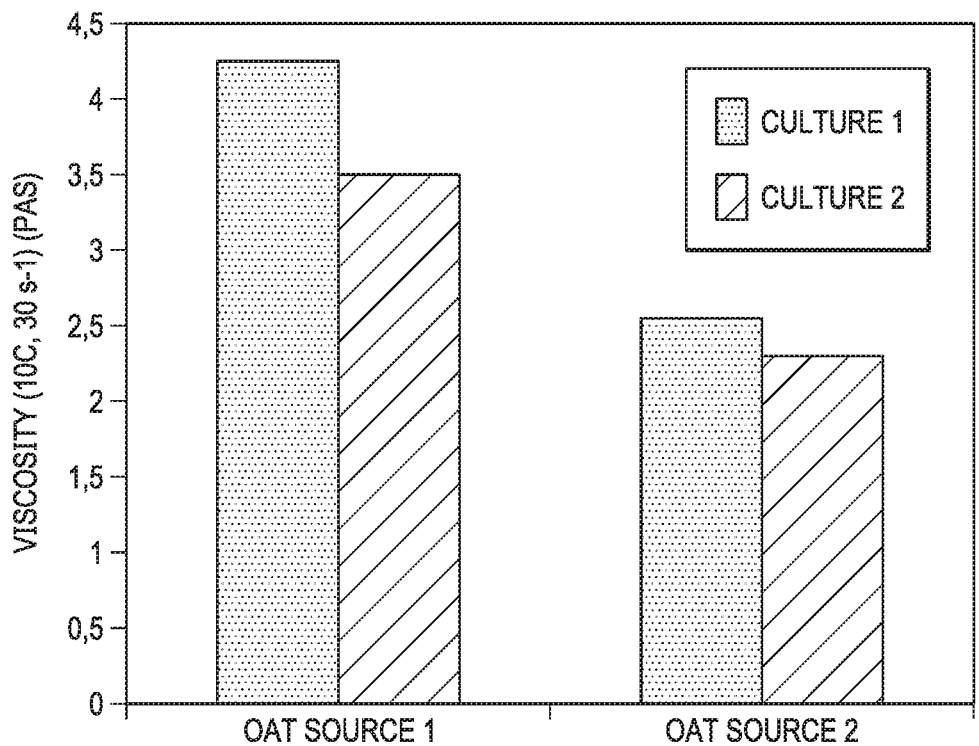
FIG. 1 is a chart depicting the effect of ingredient selection on the viscosity of a co-fermented dairy and grain food product in accordance with an illustrative embodiment.

Grains in general, and oats in particular, have recently experienced a resurgence in popularity as a result of the increasing number of studies documenting health benefits derived from their consumption. For example, studies have shown that consuming oats promotes healthy heart function. These beneficial effects are often attributed to the high soluble fiber content of oats, mainly in the form of $\beta$-glucan, which provides oats the ability to reduce low-density lipoprotein (LDL) cholesterol levels by increasing the conversion of cholesterol to bile. Additionally, consumption of oats has been shown to prevent the development of atherosclerosis through inhibition of oxidative stress and inflammation. Other known benefits of oat consumption include anti-proliferative, vasodilation, and anti-itch effects.

Dairy is a rich source of highly digestible protein that is readily bioavailable. The common reference standard for describing protein quality is the Protein Digestibility-Corrected Amino Acid Score (PDCAAS), which measures presence of essential amino acids and digestibility. Based on this protein quality measure, milk is a better source of protein when compared to, for example, beef, soy or wheat. For this reason, dairy protein is commonly used as a standard reference protein for comparison of other food sources. Dairy is also a rich source of natural calcium, vitamin D and vitamin K, which promotes bone health.

Given the claimed health benefits of dairy and grains, some food products exist that purport to combine dairy and grains in an unfermented state. Food products also exist that include either a combination of a fermented dairy ingredient mixed with unfermented grains, or a combination of a fermented grain ingredient mixed with unfermented dairy. Some food products even include a combination of a fermented dairy ingredient with a fermented grain ingredient. However, conventionally available food products do not offer a co-fermented food product formed from a co-fermented grain and dairy ingredient, which is believed to provide unique metabolites that cannot be produced by the separate or sequential fermentation of dairy and grains. As used herein, co-fermented food product includes a grain ingredient and a diary ingredient that has been fermented at the same time so that the bacterial culture can act on both the grain substrate and the dairy substrate contemporaneously. Thus, in one example co-fermentation can be achieved by mixing an unfermented grain ingredient with an unfermented dairy ingredient, then adding to the mixture a bacterial culture that ferments both substrates. In a second example, co-fermentation can be achieved by mixing an unfermented ingredient with a bacterial culture to initiate fermentation, then adding in a second unfermented ingredient within a short time to permit the bacterial culture to ferment both substrates for the remainder of the fermentation process.

The second co-fermentation process can be preferable in situations where the selected bacterial culture has a preference for fermenting one substrate over the other, or where a particular set of metabolites is desired and the selective addition of the unfermented ingredients achieves the desired metabolites. Importantly, the second unfermented ingredient should be added while a majority of the fermentation process is incomplete to allow the second unfermented ingredient sufficient time to react with the bacterial culture. For example, fermentation of a milk ingredient with lactic acid bacteria results in a drop in pH until the acidity prevents the further growth of the lactic acid bacteria, which terminates the fermentation process. Adding a grain ingredient when the pH is too low would prevent any meaningful fermentation of the grain substrate. Thus, in one embodiment involving a fermentation process that first combines a bacterial culture with a first unfermented ingredient, the second unfermented ingredient should be added to the fermentation process before the midpoint of the fermentation process. In another embodiment, the second unfermented ingredient should be added to the fermentation process before one-third of the fermentation process has been completed. In yet another embodiment, the second unfermented ingredient should be added to the fermentation process before one-quarter of the fermentation process has been completed. Completion of the fermentation process can be determined by a length of time of the reaction or by a difference in the starting pH and the ending pH that terminates the fermentation process.

In the past, skilled artisans have been dissuaded from attempting to create the co-fermented food product described herein because of the differing preservation methods traditionally used on dairy and grains, and because of the different sources of native carbohydrates in dairy and grains, which typically require different bacterial cultures for effective fermentation. Fermentation of dairy emerged historically as a method for preserving milk, and over time the health benefits of fermented dairy were established. In contrast, fermentation was not crucial for preserving grains, which explains the lack of history of grain fermentation, either independently or in combination with other substrates. Consequently, research and commercial development in fermentation technology focused on dairy substrates with a particular emphasis on lactose, the carbohydrate source in dairy.

Additionally, conventional fermentation systems for dairy-based substrates focus on the use of lactic acid bacteria (LAB) cultures for the effective fermentation of lactose, which generates acid and gas. The production of acid helps control the microbial fermentation end-point and preserves the product for longer shelf life. In contrast, fermentation of grains typically utilizes yeast for effective fermentation of grain-based carbohydrates, which generates alcohol and gas without the accompanying acidification. The byproducts of grain-based fermentation would lack the requisite acid content to attain a desirable desired shelf life.

Novel aspects of the present disclosure are directed to a co-fermented food product comprising a grain ingredient and a dairy ingredient, and also a set of metabolites derived from the co-fermentation of the grain ingredient and the dairy ingredient. In a non-limiting embodiment, the grain ingredient is oat flour and the dairy ingredient is liquid milk or reconstituted milk powder, and the set of unique metabolites are formed from the co-fermentation of the unfermented oat ingredient and the unfermented dairy ingredient.

Although certain illustrative embodiments described herein relate to a co-fermented food product formed from dairy and oats, other grains may be used instead of or in addition to oats. For example, sorghum, buckwheat, and barley are grains with a similar carbohydrate identity and fat content, which is believed to be analogous to oats.

The set of unique metabolites formed from the co-fermentation of the oat ingredient and the dairy ingredient can include short-chain fatty acids, phenolic compounds, residual sugars and carbohydrate fractions, intact proteins, peptides, exopolysaccharides, oat fiber and glucans with a desirable pre-biotic effect, and volatile flavors. These metabolites are believed to differ from the metabolites formed from a mixture of a fermented oat ingredient with a fermented dairy ingredient because the cultures typically used for effective fermentation of the two substrates is different.

The co-fermented food product can also include one or more bacterial cultures used to ferment a mixture of the unfermented oat ingredient and the unfermented dairy ingredient. In one embodiment, the bacterial culture is a thermophilic lactic acid bacteria, examples of which include *Lactobacillus delbrueckii* subsp. *bulgaricus*, *Lactobacillus acidophilus*, *Lactobacillus delbrueckii* subsp. *lactis*, *Lactobacillus fermentum*, *Lactobacillus paracasei*, *Lactobacillus rhamnosus*, *Streptococcus thermophiles*, *Bifidobacterium*, *Lactococcus lactis* subsp. *cremoris*, *Lactococcus lactis* subsp. *lactis* biovar *diacetylactis*, *Lactococcus lactis* subsp. *lactis*, *Leuconostoc mesenteroides*, *Leuconostoc pseudomesenteroides*, or combinations thereof.

Additional novel aspects of the present disclosure are directed to a co-fermented food product with either a "spoonable" or "drinkable" viscosity, achievable with unique processing steps rather than the addition of viscosity-enhancing ingredients that may alter the taste of the co-fermented food product. A drinkable food product may have a viscosity that can be poured from a container, such as bottle or cup. As an example, smoothies have viscosities that can be described as "drinkable." In contrast, a spoonable food product has a relatively higher viscosity and is not suitable for pouring. Instead, consumption of the spoonable food product generally requires use of a spoon. An example of a food product with a "spoonable" viscosity is yogurt.

In a non-limiting embodiment, a drinkable food product has a viscosity that is less than 2 Pa·s at room temperature, and in particular with a viscosity that is in the range of 0.5-1.5 Pa·s at room temperature. A spoonable food product has a viscosity that is greater than 2.5 Pa·s at room temperature, and in particular with a viscosity in the range of 2.75-5.5 Pa·s at room temperature. As used herein, unless explicitly contradicted, viscosities are determined at room temperature (e.g., in the range of 20-30° C.) and measured using a rheometer using small and large strain measurements determined at a logarithmically increasing shear rate from 0.3 to 300 s$^{-1}$. Apparent viscosity was measured using a concentric cylinder geometry or vane geometry with a shear rate of 100 s$^{-1}$.

The viscosity of the co-fermented food product described herein is impacted by the identity of the oat ingredient, the bacteria that forms the bacterial culture, and the pre-heat treatment step applied to a mixture of the unfermented oat ingredient and the unfermented dairy ingredient. An optional blending step may also increase viscosity. Importantly, added viscosity-enhancing ingredients can be avoided to prevent an undesirable effect on taste.

To illustrate the effect of oat flour selection and bacterial culture on the viscosity of a co-fermented dairy and oat food product, four samples of co-fermented dairy and oat food product were prepared in accordance with Table 1 below.

TABLE 1

Co-fermented food product with variable oat flour and bacterial culture.

| Sample No. | Dairy Ingredient | Oat Ingredient | Bacterial culture |
|---|---|---|---|
| 1 | Liquid milk | Low-protein oat flour | *Bifido bacteriam* specis, *Lactobacillus acidolphilus*, *Lactobacillus delbrueckii* subsp. *bulgaricus* and *Streptococcus thermophiles* |
| 2 | Liquid milk | Low-protein oat flour | *Lactobacillus delbrueckii* subsp. *bulgaricus* and *Streptococcus thermophilus* |
| 3 | Liquid milk | High-protein oat flour | *Bifido bacteriam* specis, *Lactobacillus acidolphilus*, *Lactobacillus delbrueckii* subsp. *bulgaricus* and *Streptococcus thermophiles* |
| 4 | Liquid milk | High-protein oat flour | *Lactobacillus delbrueckii* subsp. *bulgaricus* and *Streptococcus thermophilus* |

The dairy ingredient and the milk ingredients in Table 1 were combined at approximately 15° C., heated to 65° C., blended, then cooled to 42° C. and fermented with the identified bacterial culture for 3-7 hours, and subsequently cooled to 10° C. Viscosities were taken at 10° C. with a rheometer. Results are shown in FIG. 1.

FIG. 1 is a chart depicting the effect of ingredient selection on the viscosity of a co-fermented dairy and oat food product. Protein content of the oat ingredient has an effect on the viscosity of the co-fermented food product. Specifically, the low-protein oat flour, which has less than 13 wt % protein, yields a relatively higher viscosity than a high-protein oat flour, which has greater than 13 wt % protein. Furthermore, bacterial culture also has an effect on viscosity of the co-fermented food product. The bacterial culture formed from the combination of *Bifido bacteriam* species, *Lactobacillus acidolphilus, Lactobacillus delbrueckii* subsp. *bulgaricus* and *Streptococcus thermophiles* provided a relatively higher viscosity than the bacterial culture formed from *Lactobacillus delbrueckii* subsp. *bulgaricus* and *Streptococcus thermophiles*.

COMPARATIVE EXAMPLES

Examples of co-fermented food products formed in accordance with novel aspects described herein are shown in Tables 2 and 3 below. In Table 2, the formulation of the co-fermented food product includes fresh, liquid milk as the dairy ingredient. In Table 3, the formulation of the co-fermented food product includes reconstituted milk as the dairy ingredient. In each formulation, amounts of the various ingredients are altered to achieve a co-fermented food product targeting 1%, 2%, and 3% dairy fat. The oat flour ingredient can be the low-protein oat flour, the high-protein oat flour, or a combination of the two. Selection of the oat flour ingredient can be made to help achieve a target viscosity as previously discussed.

TABLE 2

Liquid Milk as Dairy Ingredient

| | 1% dairy fat | 2% dairy fat | 3% dairy fat |
|---|---|---|---|
| Whole liquid milk (g/100 g) | 25 | 55 | 85 |
| Skim milk (g/100 g) | 70 | 40 | 10 |
| Oat Flour (g/100 g) | 5 | 5 | 5 |

TABLE 3

Reconstituted Milk as Dairy Ingredient

| | 1% dairy fat | 2% dairy fat | 3% dairy fat |
|---|---|---|---|
| Whole milk powder (g/100 g) | 3.5 | 7.2 | 11 |
| Skim milk powder (g/100 g) | 7.5 | 3.8 | — |
| Water (g/100 g) | 84 | 84 | 84 |
| Oat Flour (g/100 g) | 5 | 5 | 5 |

Each of the co-fermented food products described in Tables 2 and 3 may include optional inclusion ingredients. The inclusion ingredients may include one or more of the following: flavorants, fruit pieces, cereal pieces, grain pieces, nuts, seeds, vegetable purees, and vegetable pieces.

The co-fermented dairy and oat food product may be sold as a fresh, chilled food product or as shelf-stable, ambient food product. When stored at 4-6° C., the fresh, chilled food product can have a refrigerated shelf-life of approximately 28 days. The shelf-stable food product stored in ambient conditions has a shelf-life between 4-12 months. By introducing a pre-heat treatment step in the method for forming the co-fermented dairy and oat food product, the viscosity of the co-fermented food product can be further modified. To illustrate the effect of the pre-heat treatment step, a co-fermented dairy and oat food product was formed in accordance with the method shown in FIG. 3 and a pre-heat treatment step was varied through a range of temperatures.

For a co-fermented dairy and oat food product offered as a shelf-stable item stored at ambient conditions, the pre-heat treatment step at lower temperatures resulted in an end product with higher viscosities, and the pre-heat treatment step at higher temperatures resulted in an end product with lower viscosities. Thus, a lower pre-heat treatment step could be implemented to attain a "spoonable" food product and a higher pre-heat treatment step could be implemented to attain a "drinkable" food product. Specifically, the lower pre-heat treatment temperatures ranged from 65° C.-96° C., and in a particular embodiment, lower pre-heat treatment temperature is about 76° C. The higher pre-heat treatment temperature ranged from 102° C.-120° C., and in a particular embodiment, the higher pre-heat treatment temperature is about 110° C.

Conversely, for a co-fermented dairy and oat food product offered as a fresh, chilled item stored in refrigerated conditions, the pre-heat treatment step temperatures in the range of 65° C.-96° C. and in the range of 102° C.-120° C. produced a "spoonable" food product; however, the pre-heat treatment step at the lower temperature range produced a food product with a relatively lower viscosity. The results of the pre-heat treatment step for a shelf-stable food products stored at ambient conditions and for a fresh, refrigerated food product are shown in FIG. 2.

Figure 2:
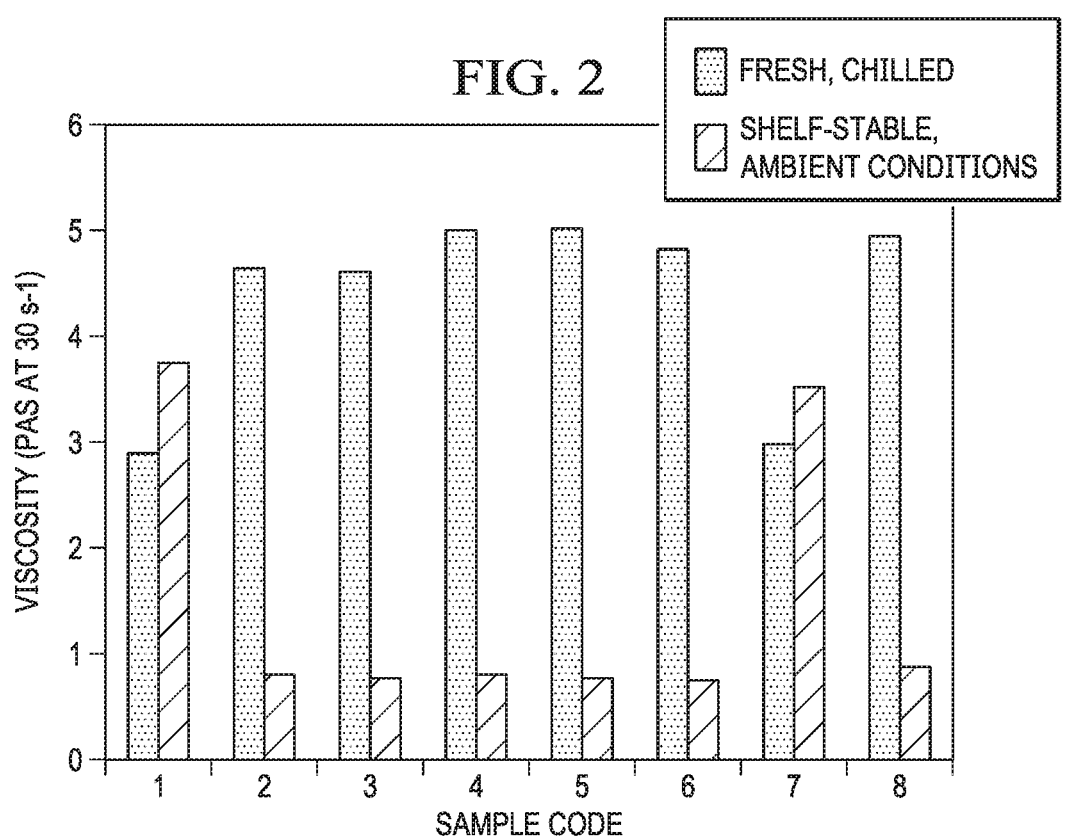
FIG. 2 is a chart depicting the results of a pre-heat treatment step for a shelf stable food product stored at ambient conditions, and for a fresh, chilled food product stored in refrigerated conditions.

FIG. 2 is a chart depicting the results of the experiment testing the effect of a pre-heat treatment step on a viscosity of a co-fermented food product in accordance with an illustrative embodiment. Sixteen samples of a co-fermented food product were created from oats and dairy, eight of which were shelf-stable food products stored at ambient conditions, and eight of which were fresh, chilled food products stored in refrigerated conditions. Two of the shelf-stable food product samples and two of the fresh, chilled food product samples were exposed to a pre-heat treatment step in the higher temperature range (sample codes 1 and 7), and the remaining samples were exposed to a pre-heat treatment step in the lower temperature range (sample codes 2-6, and 8). Results in FIG. 2 show that the pre-heat treatment step can be used to modify the viscosity of a co-fermented food product.

Figure 3:
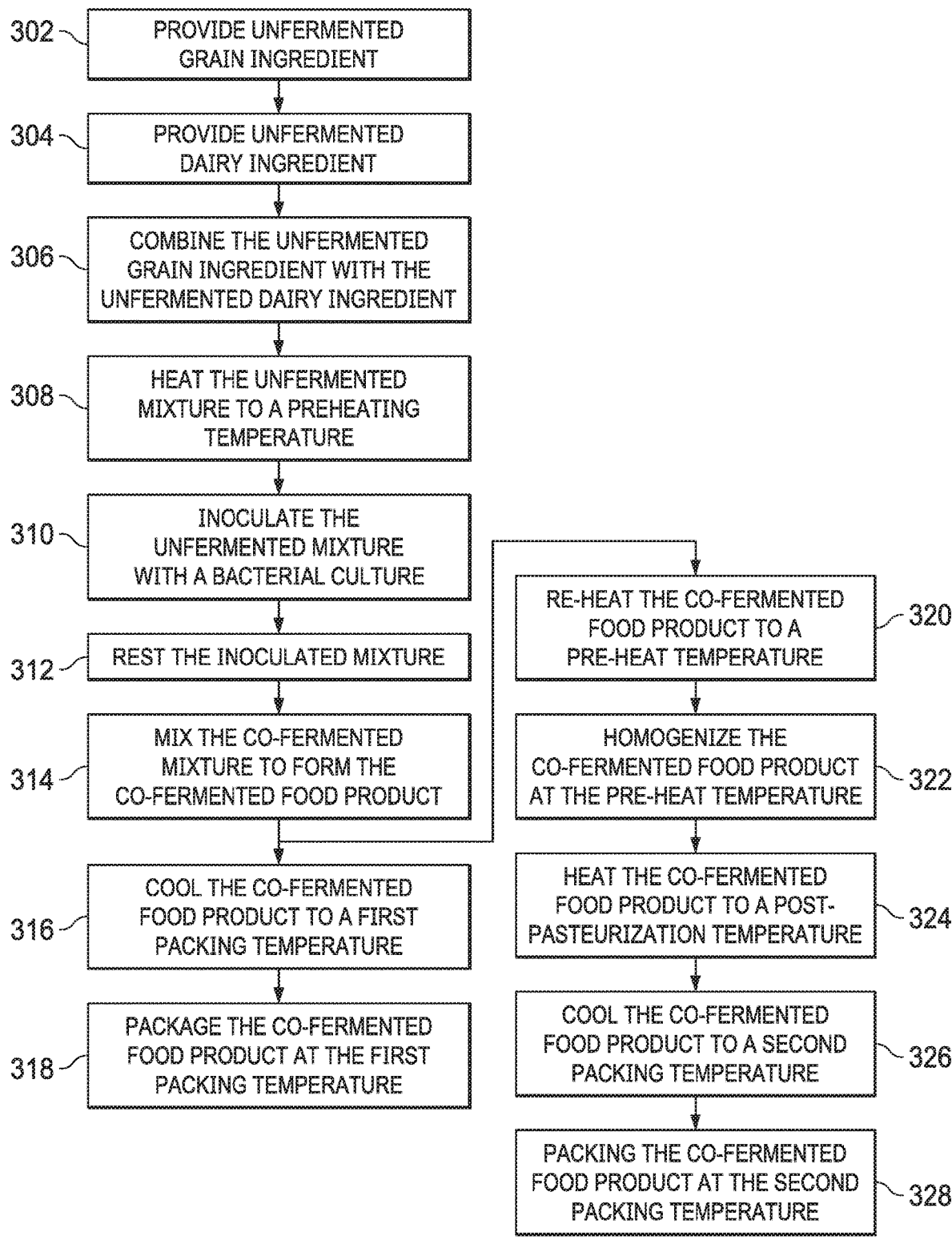
FIG. 3 is a flowchart of a process for forming a co-fermented food product in accordance with an illustrative embodiment.

FIG. 3 is a flowchart of a process for forming a co-fermented food product in accordance with an illustrative embodiment. The process can be used to form a co-fermented food product offered as a shelf-stable item stored at ambient conditions, or as a fresh, chilled item. Moreover, a pre-heat treatment step may be varied as discussed above for viscosity control. An unfermented grain ingredient is provided (Step 302). The unfermented grain ingredient may be a regular oat flour, which provides the co-fermented food product with a sweeter, dairy yogurt flavor profile. Alternatively, the grain ingredient may be a high-protein oat flour, which provides a slightly savory dairy yogurt flavor profile and a lower viscosity. In other embodiments, the grain ingredient may include whole grain oat flour, extruded oat flour, or enzymatically pre-treated oat flour, with or without extrusion, and combinations thereof.

An unfermented dairy ingredient is also provided (Step 304). The unfermented dairy ingredient may be a fresh, liquid milk or a reconstituted milk formed from water and milk powder. One non-limiting example of fresh, liquid milk is cow's milk, and non-limiting examples of milk powder may include skim milk powder, whole milk powder, milk protein concentrate, whey protein concentrate, whey protein isolate, butter milk powder, or combinations thereof. Amounts of the unfermented grain ingredient and the unfermented dairy ingredient may be selected in accordance with Tables 2 and 3 to achieve a desired amount of dairy fat.

The unfermented grain ingredient and the unfermented dairy ingredient are combined to form an unfermented mixture (Step 306). In one embodiment, the combining step includes a blending step to that results in the homogeneous dispersion of ingredients. A sufficient amount of blending step can be achieved in 2-15 minutes using conventionally available equipment.

Thereafter the unfermented mixture is heated to a pre-heat treatment temperature to form a pre-heated mixture (Step 308). The pre-heating temperature is selected based a desired viscosity of the co-fermented food product and the type of co-fermented food product offered, as previously mentioned. In one embodiment, the pre-heat treatment temperature is maintained for a time between 12-20 minutes.

Subsequently, the pre-heated mixture is inoculated with a bacterial culture to form an inoculated mixture (Step 310). In one embodiment, the inoculated mixture is formed from about 0.02-0.08 wt % of the bacterial culture. In another embodiment, the inoculated mixture is formed from about 0.03-0.07 wt % of the bacterial culture, and in one specific embodiment the inoculated mixture is formed from about 0.05 wt % of the bacterial culture. The bacterial culture can be a thermophilic lactic acid bacteria that includes one or more of the following: *Lactobacillus delbrueckii* subsp. *bulgaricus*, *Lactobacillus acidophilus*, *Lactobacillus delbrueckii* subsp. *lactis*, *Lactobacillus fermentum*, *Lactobacillus paracasei*, *Lactobacillus rhamnosus*, *Streptococcus thermophiles*, *Bifidobacterium*, *Lactococcus lactis* subsp. *cremoris*, *Lactococcus lactis* subsp. *lactis* biovar *diacetylactis*, *Lactococcus lactis* subsp. *lactis*, *Leuconostoc mesenteroides*, *Leuconostoc pseudomesenteroides*. In one embodiment, the inoculating step includes the optional step of adding a lactase enzyme to the pre-heated mixture. In one embodiment, lactase forms about 0.01-0.05 wt % of the pre-heated mixture. In another embodiment, lactase forms about 0.02-0.04 wt % of the pre-heated mixture, and in one specific embodiment, lactase forms about 0.03 wt % of the pre-heated mixture.

In a non-limiting embodiment, the pre-heated mixture is inoculated with the bacterial culture while the pre-heated mixture is at an inoculation temperature. The inoculation temperature is in the range between 32° C.-52° C., or between 37° C.-47° C. In one particular embodiment, the inoculation temperature is at about 42° C. Because the pre-heating temperature of the heating step is higher than the inoculation temperature, the illustrative process in FIG. 3 can include the optional step of cooling the pre-heated mixture to the inoculation temperature before performing the inoculation step. Cooling may be achieved by any conventionally available methods, including use of cooling water in a jacketed tank or the use of plate or tubular heat exchangers for active cooling.

The inoculated mixture is rested to form a co-fermented mixture (Step 312). In a non-limiting embodiment, the co-fermented mixture is rested for at least 3 hours, and in a more particular embodiment, the co-fermented mixture is rested for 3-7 hours. In another embodiment, the co-fermented mixture is rested for 4-6 hours. In one embodiment, the inoculated mixture is rested at the inoculation temperature. The resting period allows the inoculated mixture to achieve a target pH between 4-5, or more specifically the target pH is between 4.3-4.9 In a more particular embodiment, the inoculated mixture is rested for a time sufficient to achieve the target pH of about 4.6. A pH in the range 4-5, and in particular around 4.6 provides a co-fermented food product with an optimal balance between sweet and sour taste profiles, which mitigates the negative sensory impact of further acidification in the co-fermented food product.

The co-fermented mixture is then blended to form the co-fermented food product (Step 314). In one embodiment, the blending step is conducted at high shear. The high shear homogenizes the food product to achieve a desired texture and viscosity, and also helps to stop the fermentation reaction in the event that the reaction has not ended in the prior resting step. As an example, the blending step can be achieved by using a high shear mixer operating at 600 rpm for 2-15 minutes. During the blending step or shortly thereafter, an inclusion ingredient may be mixed into the co-fermented mixture.

The co-fermented food product can be offered to consumers as a fresh, chilled food product or as a shelf-stable, ambient food product. In the event that the co-fermented food product is offered as a fresh, chilled food product, the co-fermented food product formed in Step 314 is cooled to a first packing temperature (Step 316). In a non-limiting embodiment, the first packing temperature is in the range between 4-5° C. The co-fermented food product is then packaged at the first packing temperature (Step 318). The fresh, chilled food product is maintained at the first packing temperature until consumption.

In the event that the co-fermented food product is offered as a shelf-stable, food product stored at ambient conditions, the co-fermented food product formed in Step 114 is pre-heated to a second pre-heat temperature (Step 320). In one embodiment, the second pre-heat temperature is between 60° C.-70° C., and in a particular embodiment the second pre-heat temperature is 65° C. Thereafter, the co-fermented food product is homogenized at the pre-heat temperature and at a pressure between 190-210 bar (Step 322). The co-fermented food product is then heated to a post-pasteurization temperature (Step 324). In one embodiment, the post-pasteurization temperature is a temperature between 100-110° C., and the co-fermented food product is maintained at the post-pasteurization temperature for a time between 25-35 seconds. In a particular embodiment, the post-pasteurization temperature is 105° C. Thereafter, the co-fermented food product is cooled from the post-pasteurization temperature to a second packing temperature (Step 326). In a non-limiting embodiment, the second packing temperature is between 15° C.-25° C. In a specific embodiment, the second packing temperature is about 20° C. Finally, the co-fermented food product is packaged at the second packing temperature (Step 328).

Additional Embodiments

The following paragraphs are offered as further description of various embodiments of the disclosed invention.

In a first embodiment, novel aspects of the present disclosure describe a co-fermented food product comprising a grain ingredient; a dairy ingredient; and a bacterial culture; wherein the co-fermented food product comprises a set of metabolites derived from the co-fermentation of the grain ingredient and the dairy ingredient with the bacterial culture.

In another aspect of the first embodiment, novel aspects of the present disclosure describe a co-fermented food product comprising a grain ingredient; a dairy ingredient; and a bacterial culture; wherein the co-fermented food product comprises a set of metabolites derived from the co-fermentation of the grain ingredient and the dairy ingredient with the bacterial culture; and wherein the co-fermented food product comprises one or more limitations selected from the following list:

wherein the co-fermented food product further comprises between 2.5-3.9 wt % protein;

wherein the co-fermented food product further comprises between 1.0-1.5 wt % fat;

wherein the co-fermented food product further comprises less than 10 wt % carbohydrates;

wherein the co-fermented food product further comprises between 4.5-5 wt % lactose;

wherein the grain ingredient is between 4-6 wt % of the co-fermented food product;

wherein the grain ingredient provides at least 8 grams of whole grains in the co-fermented food product;

wherein the dairy ingredient is 75-85 wt % of the co-fermented food product;

wherein the grain ingredient comprises oat flour;

wherein the dairy ingredient comprises one or more of liquid milk, yoghurt, and reconstituted milk powder;

wherein the co-fermented food product further comprises a thermophilic lactic acid bacteria, wherein the thermophilic lactic acid bacteria comprises one or more of the following: *Lactobacillus delbrueckii* subsp. *bulgaricus*, *Lactobacillus acidophilus*, *Lactobacillus delbrueckii* subsp. *lactis*, *Lactobacillus fermentum*, *Lactobacillus paracasei*, *Lactobacillus rhamnosus*, *Streptococcus thermophiles*, *Bifidobacterium*, *Lactococcus lactis* subsp. *cremoris*, *Lactococcus lactis* subsp. *lactis biovar diacetylactis*, *Lactococcus lactis* subsp. *lactis*, *Leuconostoc mesenteroides*, *Leuconostoc pseudomesenteroides*;

wherein the inoculated mixture is formed from about 0.03-0.07 wt % of the bacterial culture;

wherein the inoculated mixture is formed from about 0.02-0.08 wt % of the bacterial culture;

wherein the inoculated mixture is formed from about 0.05 wt % of the bacterial culture;

wherein the co-fermented food product further comprises an inclusion ingredient including one or more of the following: flavorants, fruit pieces, cereal pieces, grain pieces, nuts, seeds, vegetable purees, and vegetable pieces;

wherein the co-fermented food product further comprises either a first viscosity in the range of 2.75-5.5 Pa·s or a second viscosity in the range of 0.5-1.5 Pa·s.

In a second embodiment, novel aspects of the present disclosure describe a method for making a co-fermented food product, the method comprising: combining an unfermented grain ingredient with an unfermented dairy ingredient to form an unfermented mixture; heating the unfermented mixture to a pre-heating temperature to form a pre-heated mixture; inoculating the pre-heated mixture with a bacterial culture to form an inoculated mixture; resting the inoculated mixture to form a co-fermented mixture; and blending the co-fermented mixture to form the co-fermented food product.

In another aspect of the second embodiment, novel aspects of the present disclosure describe a method for making a co-fermented food product, the method comprising: combining an unfermented grain ingredient with an unfermented dairy ingredient to form an unfermented mixture; heating the unfermented mixture to a pre-heating temperature to form a pre-heated mixture; inoculating the pre-heated mixture with a bacterial culture to form an inoculated mixture; resting the inoculated mixture to form a co-fermented mixture; blending the co-fermented mixture to form the co-fermented food product; and one or more limitations selected from the following list:

wherein the pre-heating temperature is in the range between 65° C. to 96° C. to form the co-fermented food product with a viscosity between 2.75 Pa·s-5.5 Pa·s at room temperature;

wherein the pre-heating temperature is about 76° C.;

wherein the pre-heating temperature is in the range between 102° C.-120° C. to form the co-fermented food product with a viscosity between 0.5 Pa·s-1.5 Pa·s at room temperature;

wherein the pre-heating temperature is about 110° C.;

wherein the unfermented mixture is maintained at the pre-heating temperature for a time between 12-20 minutes;

wherein the resting step further comprises resting the inoculated mixture for 3-7 hours;

wherein the resting step further comprises resting the inoculated mixture for 4-6 hours;

wherein the resting step further comprises resting the inoculated mixture until the inoculated mixture achieves the target pH, wherein the target pH is between 4-5;

wherein the target pH is between 4.3-4.9;

wherein the target pH is 4.6;

wherein the method further comprises cooling the pre-heated mixture to an inoculation temperature before inoculating the pre-heated mixture;

wherein the inoculation temperature is between 32° C.-52° C.;
wherein the inoculation temperature is between 37° C.-47° C.;
wherein the inoculation temperature is about 42° C.;
wherein the grain ingredient is oat flour;
wherein the milk ingredient comprises at least one of fresh liquid milk, reconstituted milk;
wherein the combining step further comprises: selecting a first amount of the unfermented dairy ingredient to provide at least one of 0.5%-1.5% dairy fat in the co-fermented food product and between 2.5%-3.5% dairy protein in the co-fermented food product; and selecting a second amount of the unfermented grain ingredient to provide between 4%-6% of the grain ingredient in the co-fermented food product;
wherein the bacterial culture is a thermophilic lactic acid bacteria;
wherein the thermophilic lactic acid bacteria comprises one or more of the following: *Lactobacillus delbrueckii* subsp. *bulgaricus*, *Lactobacillus acidophilus*, *Lactobacillus delbrueckii* subsp. *lactis*, *Lactobacillus fermentum*, *Lactobacillus paracasei*, *Lactobacillus rhamnosus*, *Streptococcus thermophiles*, *Bifidobacterium*, *Lactococcus lactis* subsp. *cremoris*, *Lactococcus lactis* subsp. *lactis biovar diacetylactis*, *Lactococcus lactis* subsp. *lactis*, *Leuconostoc mesenteroides*, *Leuconostoc pseudomesenteroides*;
wherein the *Bifidobacterium* comprises one or more of *Bifidobacterium infantis* and *Bifidobacterium lactis*;
wherein the inoculating step further comprises adding a lactase enzyme to the pre-heated mixture;
wherein the method further comprises mixing an inclusion ingredient into the co-fermented food product;
wherein the inclusion ingredient further comprises one or more of the following: flavorants, fruit pieces, cereal pieces, grain pieces, nuts, seeds, vegetable purees, and vegetable pieces;
wherein the blending step is conducted at high shear;
wherein the blending step further comprises blending the co-fermented mixture for 2-15 minutes;
wherein the method further comprises cooling the co-fermented food product to a first packing temperature, wherein the packing temperature is between 4° C.-5° C.; and packing the co-fermented food product at the packing temperature;
wherein the method further comprises: re-heating the co-fermented food product to a pasteurization temperature, wherein the pasteurization temperature is between 60° C.-70° C.; homogenizing the co-fermented food product at the pasteurization temperature and at a pressure between 190-210 bar; and heating the co-fermented food product to a post-pasteurization temperature for 25-35 seconds, wherein the post-pasteurization temperature is between 100° C.-110° C.;
wherein the method further comprises cooling the co-fermented food product from the post-pasteurization temperature to a second packing temperature, wherein the packing temperature is between 15° C.-25° C.; and packaging the co-fermented food product at the second packing temperature.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. For example, it should be understood that the method steps described herein are exemplary, and upon reading the present disclosure, a skilled person would understand that one or more method steps described herein can be combined, omitted, re-ordered, or substituted.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for making a co-fermented food product comprising:
    combining about 5 wt. % of an unfermented grain ingredient with about 11 wt. % of an unfermented dairy ingredient and about 84 wt. % of water to form an unfermented mixture;
    heating the unfermented mixture to a pre-heat treatment temperature in the range between 65° C. to 88° C. or in the range between 102° C. to 120° C. to form a pre-heated mixture, wherein the pre-heat treatment temperature between 65° C. to 88° C. forms a spoonable food product with a viscosity between 2.75 Pa·s and 5.5 Pa·s at room temperature and the pre-heat treatment between 102° C. to 120° C. forms a drinkable food product with a viscosity between 0.5 Pa·s and 1.5 Pa·s at room temperature;
    cooling the pre-heated mixture to an inoculation temperature in the range between 32° C. to 52° C.;
    inoculating the cooled mixture with a thermophilic lactic acid bacterial culture to form an inoculated mixture;
    resting the inoculated mixture to form a co-fermented mixture;
    blending the co-fermented mixture to form the co-fermented food product; and
    adding an inclusion ingredient after blending.

2. The method of claim 1, wherein the drinkable food product is a shelf-stable food product.

3. The method of claim 1, wherein the unfermented mixture is maintained at the pre-heating temperature for a time between 12-20 minutes.

4. The method of claim 1, wherein the resting step further comprises resting the inoculated mixture for 3-7 hours.

5. The method of claim 1, wherein the resting step further comprises resting the inoculated mixture until the inoculated mixture achieves a target pH between 4-5.

6. The method of claim 1, further comprising:
cooling the co-fermented food product to a first packing temperature between 4° C.-5° C.; and
packaging the co-fermented food product at the packing temperature.

7. The method of claim 1, further comprising:
re-heating the co-fermented food product to a pasteurization temperature between 60° C.-70° C.;
homogenizing the co-fermented food product at the pasteurization temperature and at a pressure between 190-210 bar; and
heating the homogenized co-fermented food product to a post-pasteurization temperature between 100° C.-110° C. for 25-35 seconds.

8. The method of claim 7, further comprising:
cooling the co-fermented food product from the post-pasteurization temperature to a second packing temperature between 15° C.-25° C.; and
packaging the co-fermented food product at the second packaging temperature.

* * * * *